Sept. 1, 1953 R. G. PERRIGO 2,650,850
GUARD FOR AUTOMOBILE GRILLES AND RADIATORS
Original Filed Nov. 3, 1948
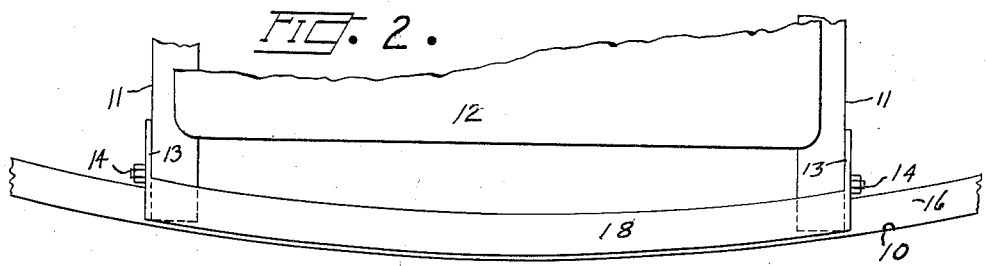
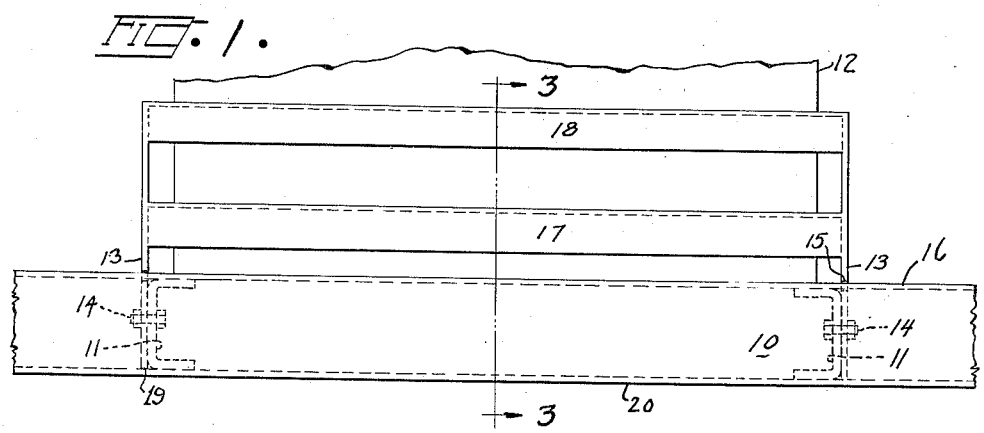
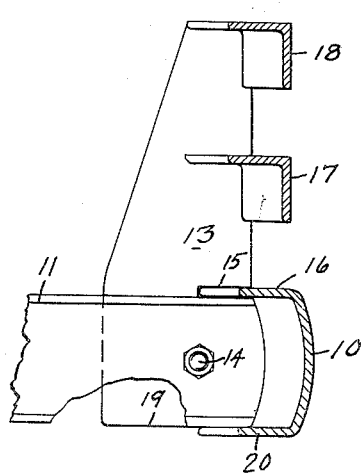
INVENTOR
R. G. PERRIGO
ATTORNEY Patented Sept. 1, 1953

2,650,850

UNITED STATES PATENT OFFICE 2,650,850

GUARD FOR AUTOMOBILE GRILLES AND RADIATORS

Richard G. Perrigo, Seaside, Oreg.

Substituted for abandoned application Serial No. 58,107, November 3, 1948. This application September 26, 1950, Serial No. 186,729

2 Claims. (Cl. 293—64)

This invention relates generally to automotive vehicles and particularly to a guard for automobile grille and radiator.

The main object of this invention is to construct a guard of the class described that can be easily and advantageously mounted on a common form of present day truck bumper and made to serve as a protection for the radiator and grille directly behind and above the bumper.

A second object is to so construct the device that it will require no alterations in the existing bumper and that the attachment may be made with a wrench without the use of any other tools.

The third object is to so fabricate the guard that the component parts thereof will require a minimum amount of bending in order that the initial strength thereof will not be impaired.

These and other objects are accomplished in a manner set forth in the following specification as illustrated in the accompanying drawings, in which:

Fig. 1 is a fragmentary front elevation of a bumper and radiator and showing my guard in relation thereto.

Fig. 2 is a plan of Fig. 1.

Fig. 3 is a vertical section taken along the line 3—3 in Fig. 1.

Like numbers of reference refer to the same or similar parts throughout the several views.

Referring in detail to the drawing, there is shown a truck bumper 10 of channel shaped cross section which is attached to the chassis 11. Behind the bumper 10 is a radiator grille 12 which it is desired to protect.

Referring particularly to my invention, it will be seen to include a pair of upright standards 13 which are secured to the chassis 11 by means of the bolts 14. The standards 13 are provided with slots 15 on their forward edges to receive the top side 16 of the bumper 10.

Secured across the standards 13, above the bumper 10, are the horizontal angle bar rails 17 and 18 which are curved similarly to the bumper 10 and are a trifle behind the foremost edge of the bumper 10.

It is desirable to weld the members 17 and 18 to the standards 13.

It can be seen from the foregoing that by this simple and sturdy construction, the truck grille and radiator can be very effectively protected.

It will be noted that the bumper side 16 acts as a key in the slot 15 and prevents any movement of the standards 13 on the bolts 14. This holding action is improved by the lower side 19 of the standards 13 fitting upon the bottom side 20 of the bumper 10.

This application is a substitute of original filed November 3, 1948, Serial No. 58,107, now abandoned.

I claim:

1. A guard for automobile radiators comprising a pair of upright standards adapted to be bolted to the forward ends of a chassis frame at their junctions with the bumper, said standards having slots formed in their forward edges adapted to receive the top leg of a channel shaped bumper, the lower end of each standard resting on the top side of the lower bumper leg and a pair of angle bar rails curved to conform with said bumper and joined integrally with said standards.

2. A guard for radiators comprising a pair of transversely curved angle bar rails disposed above an automobile bumper and a pair of upright standards secured at the opposite ends of said rails, said standards having bolt openings formed therein whereby the standards may be attached to the chassis frames at their meetings with the bumper, said standards having slots in the forward edges thereof adapted to receive the upper leg of a channel shaped bumper while the lower ends of the standards rest on the lower bumper leg.

RICHARD G. PERRIGO.

References Cited in the file of this patent

UNITED STATES PATENTS

| Number | Name | Date |
| --- | --- | --- |
| D. 154,747 | Bustin | Aug. 9, 1949 |
| 1,325,739 | Lyon | Dec. 23, 1919 |
| 2,191,751 | Cataldo | Feb. 27, 1940 |
| 2,211,821 | Jandus | Aug. 20, 1940 |
| 2,229,491 | Brooke | Jan. 21, 1941 |